United States Patent
Chiou et al.

(10) Patent No.: US 6,936,474 B2
(45) Date of Patent: Aug. 30, 2005

(54) METHOD AND APPARATUS FOR MANUFACTURING BIOCHIP

(75) Inventors: Chung-Fan Chiou, Hsinchu (TW); Shyh-Haur Su, Hsinchu (TW); Je-Ping Hu, Taipei Hsien (TW); Ying-Chi Chen, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 540 days.

(21) Appl. No.: 10/021,706

(22) Filed: Nov. 5, 2001

(65) Prior Publication Data

US 2003/0087444 A1 May 8, 2003

(51) Int. Cl.[7] .......................... G01N 1/10; G01N 21/00; G01N 31/00; G01N 33/00; B37B 27/04
(52) U.S. Cl. .......................... 436/180; 422/100; 422/63; 422/64; 422/65; 422/66; 422/67; 422/68.1
(58) Field of Search .......................... 435/286.4, 287.3; 422/100, 63–67, 68.1; 436/180

(56) References Cited

U.S. PATENT DOCUMENTS

| | | | | |
|---|---|---|---|---|
| 5,425,918 A | * | 6/1995 | Healey et al. | 422/64 |
| 5,508,200 A | * | 4/1996 | Tiffany et al. | 436/44 |
| 6,001,309 A | * | 12/1999 | Gamble et al. | 422/100 |
| 6,063,339 A | | 5/2000 | Tisone et al. | |
| 6,228,659 B1 | * | 5/2001 | Kowallis et al. | 436/180 |
| 6,296,809 B1 | * | 10/2001 | Richards et al. | 422/64 |
| 6,309,891 B1 | * | 10/2001 | Shalon et al. | 436/180 |
| 6,352,861 B1 | * | 3/2002 | Copeland et al. | 436/46 |
| 6,503,454 B1 | * | 1/2003 | Hadimioglu et al. | 422/100 |
| 6,541,261 B1 | * | 4/2003 | Bogen et al. | 436/46 |
| 6,558,623 B1 | * | 5/2003 | Ganz et al. | 422/63 |
| 6,569,385 B1 | * | 5/2003 | Little et al. | 422/100 |
| 6,582,962 B1 | * | 6/2003 | Richards et al. | 436/46 |
| 2002/0098115 A1 | * | 7/2002 | Fawcett et al. | 422/63 |
| 2003/0032191 A1 | * | 2/2003 | Hilson et al. | 436/47 |

FOREIGN PATENT DOCUMENTS

| | | |
|---|---|---|
| WO | WO-00/13796 A1 | 3/2000 |
| WO | WO-00/63705 A1 | 10/2000 |

* cited by examiner

Primary Examiner—Jill Warden
Assistant Examiner—Brian R. Gordon
(74) Attorney, Agent, or Firm—Darby & Darby

(57) ABSTRACT

A method and apparatus for manufacturing biochips. The apparatus includes a conveying device and a series of dispensers positioned at a series of dispensing positions above the conveying device. At least one substrate is disposed on the conveying device, and the conveying device successively moves each substrate below the series of dispensers. Each of the dispensers has a plurality of nozzles facing the substrate. Each of the nozzles dispenses a predetermined reagent onto the substrate; a plurality of reagents is dispensed on the substrate at each dispensing position.

31 Claims, 12 Drawing Sheets

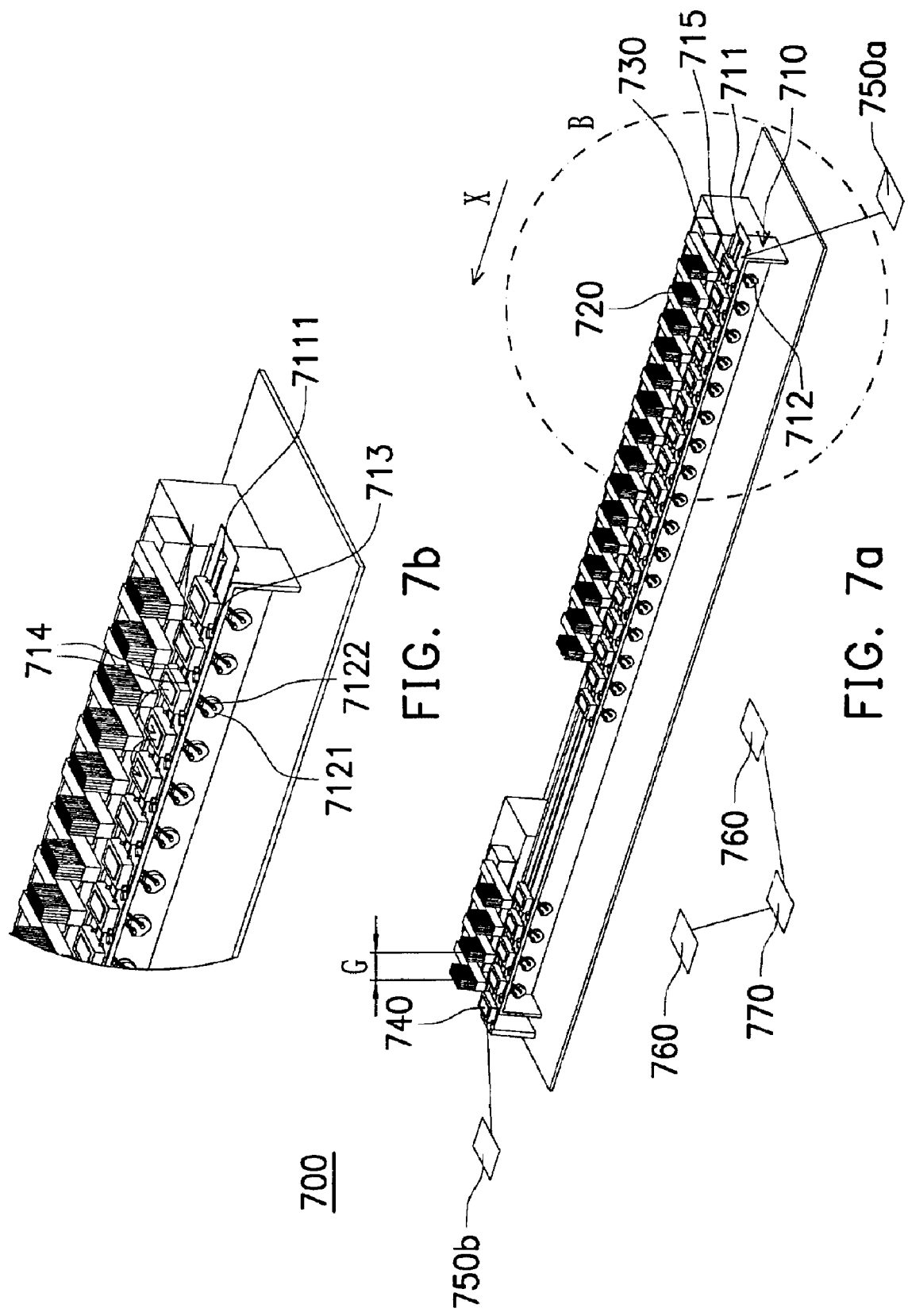

METHOD AND APPARATUS FOR MANUFACTURING BIOCHIP

BACKGROUND OF THE INVENTION

1. Field of the Invention

The invention relates to a method and apparatus for manufacturing biochips; in particular, the invention relates to a method and apparatus for mass producing biochips with a high-density array of reagents disposed thereupon.

2. Description of the Related Art

Advances in industries employing chemical and biological processes have created a need for devices that accurately and automatically dispense small quantities of liquids containing chemically or biologically active substances for commercial or experimental use. Accuracy and precision in the amount of liquid dispensed is important both from the standpoint of causing a desired reaction and minimizing the amount of material used. An example of a device with an array of reagents disposed thereupon is a biochip.

FIG. 1 is a schematic flow representation of a system for producing a biochip according to U.S. Pat. No. 6,001,309. In FIG. 1, a storage subsystem 300 is shown as an array of racks. Each bin in the rack contains an array of storage well plates 302. A master controller 304 controls the system. Under computer signal, one or more plates 302 are conveyed from the storage area 300 to the next station 306. At the station 306 a robotic arm 308 is under the control of subsystem controller 309. The robotic arm 308 using micropipette tips 310 transfers microliter quantities of liquid from the plate 302 to one or more appropriate jet to-be-filled 312 located at a maintenance and fill station under the control of subsystem controller 315. For reusable jetting devices, the maintenance and fill station has maintenance caps 316. A holder 318 positions the jetting device 312 on a translation bar 320; thereby, the jetting device 312 is moved to the test station 322 under the control of subsystem controller 323. If the jetting device 312 passes the test station, it is then moved by means of the translation bar 320 to the jetting position 334 and positioned over the substrate 336 by means of the translation bar 320 and the holder 318. The jetting dispenser is now in position to begin jetting drops to create the biochip.

FIG. 2a and FIG. 2b show another conventional dispensing apparatus 108 disclosed in U.S. Pat. No. 6,063,339. The dispensing apparatus 108 generally comprises a dispensing head 128 having a dispensing means 204 operated by an actuator. The dispensing head 108 is mounted on an X-Y table 110, including position stepper motor 123, 124 that are operable to move the dispensing head 128 and the table 112. A syringe pump 120 is hydraulically coupled to a fluid reservoir 116 through a first one-way check valve 145. The syringe pump 120 draws fluid 130 from the fluid reservoir 116 and provides it to the dispensing head 128 through a second check valve 145. The syringe pump 120 is operated by a syringe pump driver 142 for extending and retracting the piston 118 within the syringe barrel 362. When the piston 118 is extended, reagent 130 is forced to flow from the syringe barrel 362 into the dispensing head 128 via the supply tube, whereupon it is ejected by the dispensing head 128 onto the substrate 111 in the form of droplets. A controller 114 oversees operation of the pump 120, X-Y table 110, and the dispensing head 128.

FIG. 2b shows a schematic view of a substrate 111. The substrate 111 is divided into rows 714 and columns 716 having a predetermined resolution in terms of a number of addressable target areas 706 per linear distance. Upon executing a first linear pass 730 along a first row, the dispensing head reverses direction and executes a second pass 734 along an adjacent second row. Such bi-directional dispensing advantageously decreases the time required to complete a dispensing operation in comparison to a unidirectional dispensing operation.

Since the chemical and biological analysis are rapidly growing fields, mass production of biochips is required. However, since the system disclosed in U.S. Pat. No. 6,001,309 is provided with only one jetting device, it actuates only one dispenser at a time. Thus, the manufacturing efficiency of the biochips is low.

Similarly, in the method cited from U.S. Pat. No. 6,063,339, since only one substrate is placed on the table, only one biochip can be made at a time. Thus, this method is not adapted for mass production.

SUMMARY OF THE INVENTION

In order to address the disadvantages of the aforementioned method and apparatus, the invention provides a method and apparatus for mass producing the biochips with a high-density array of reagents disposed thereupon.

Another purpose of the invention is to provide a method and apparatus that can increase the efficiency of manufacturing biochips.

Accordingly, the invention provides an apparatus for manufacturing a biochip from a substrate. The apparatus comprises a conveying device and a series of dispensers positioned at a series of dispensing positions above the conveying device. At least one substrate is disposed on the conveying device, and the conveying device successively moves each substrate below the series of dispensers. Each of the dispensers has a plurality of nozzles facing the substrate. Each of the nozzles dispenses a predetermined reagent at a predetermined position of the substrate; thereby, a plurality of reagents is dispensed on the substrate at each dispensing position. The successive movement of the substrate below the series of dispensers obtains a biochip with a high-density array of reagents disposed thereupon.

In a first preferred embodiment, the conveying device moves the substrates linearly along a first axis. The dispensers are positioned above the conveying device and separated by a predetermined distance. The conveying device moves each substrate the predetermined distance along the first axis in a step-by-step manner such that the substrate is positioned in turn below each dispenser during the fabrication of the biochip. When the substrate is positioned below each dispenser, an array of reagents is dispensed thereupon.

In a second preferred embodiment, the conveying device moves the substrates linearly along a first axis. The dispensers are divided into a plurality groups positioned above the conveying device and separated by a predetermined distance. Each group comprises a plurality of dispensers linearly disposed along a second axis perpendicular to the first axis. The conveying device moves each substrate the predetermined distance along the first axis in a step-by-step manner such that the substrate is positioned in turn below each group of dispensers during the fabrication of the biochip. When the substrate is positioned below each group dispensers, a driving device moves the group of dispensers along the second axis in a step-by-step manner such that each dispenser of each group is positioned in turn above the substrate during the fabrication of the biochip. When the substrate is positioned below each dispenser, a plurality of reagents is dispensed thereupon.

In a third preferred embodiment, the conveying device rotates the substrates through a circular path. The dispensers are positioned in a ring above the conveying device and separated by a predetermined distance. The conveying device rotates each substrate such that it travels an arc covering the predetermined distance in a step-by-step manner so that the substrate is positioned in turn below each dispenser during the fabrication of the biochip. When the substrate is positioned below each dispenser, a plurality of reagents is dispensed thereupon.

BRIEF DESCRIPTION OF THE DRAWINGS

The invention is hereinafter described in detail with reference to the accompanying drawings in which:

FIG. 2b is a schematic drawing illustrating a method of depositing an array of reagents onto a substrate by the apparatus shown in FIG. 2a;

FIG. 3a is a schematic view depicting a first embodiment of a biochip-manufacturing apparatus as disclosed in this invention;

FIG. 3b is an enlarged view of part A in FIG. 3a;

FIG. 7a is a schematic view depicting a fourth embodiment of a biochip-manufacturing apparatus as disclosed in this invention; and FIG. 7b is an enlarged view of part B in FIG. 7a.

DETAILED DESCRIPTION OF THE INVENTION

First Embodiment

Figure 1:
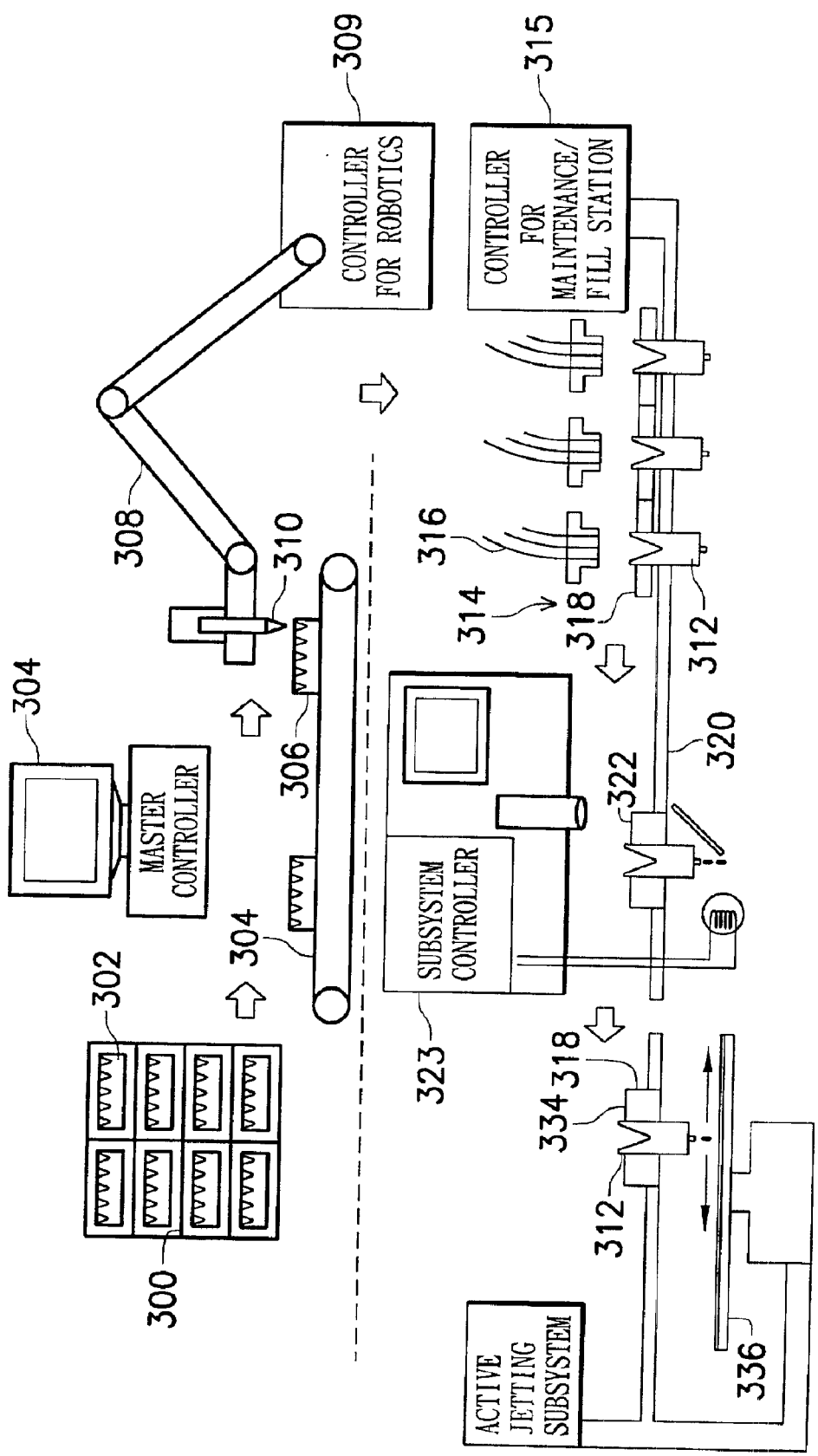
FIG. 1 is a schematic flow representation of a conventional system for producing biochips according to U.S. Pat. No. 6,001,309.
Figure 2A:
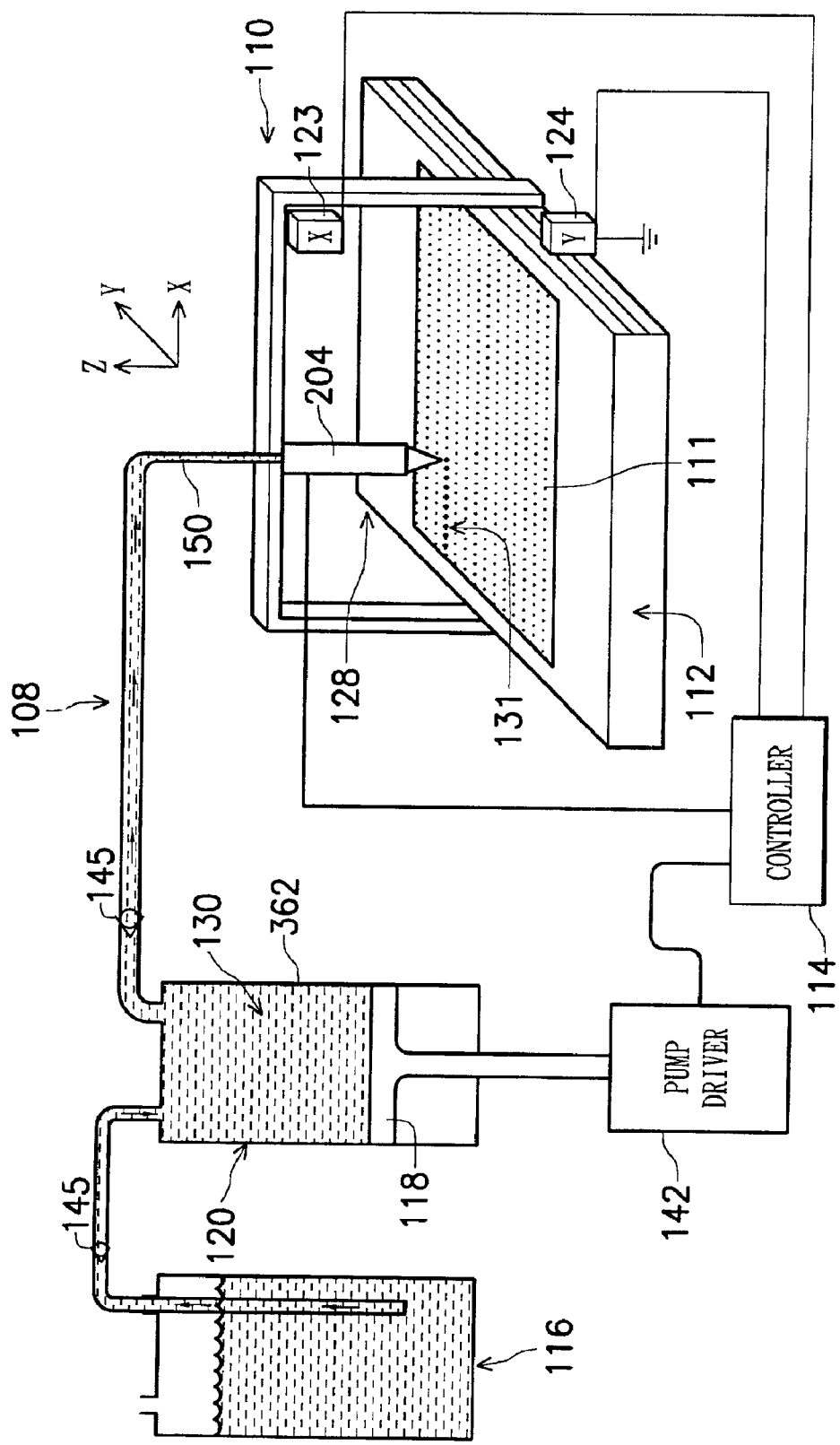
FIG. 2a is a simplified schematic drawing illustrating another conventional dispensing apparatus according to U.S. Pat. No. 6,063,339.
Figure 2B:
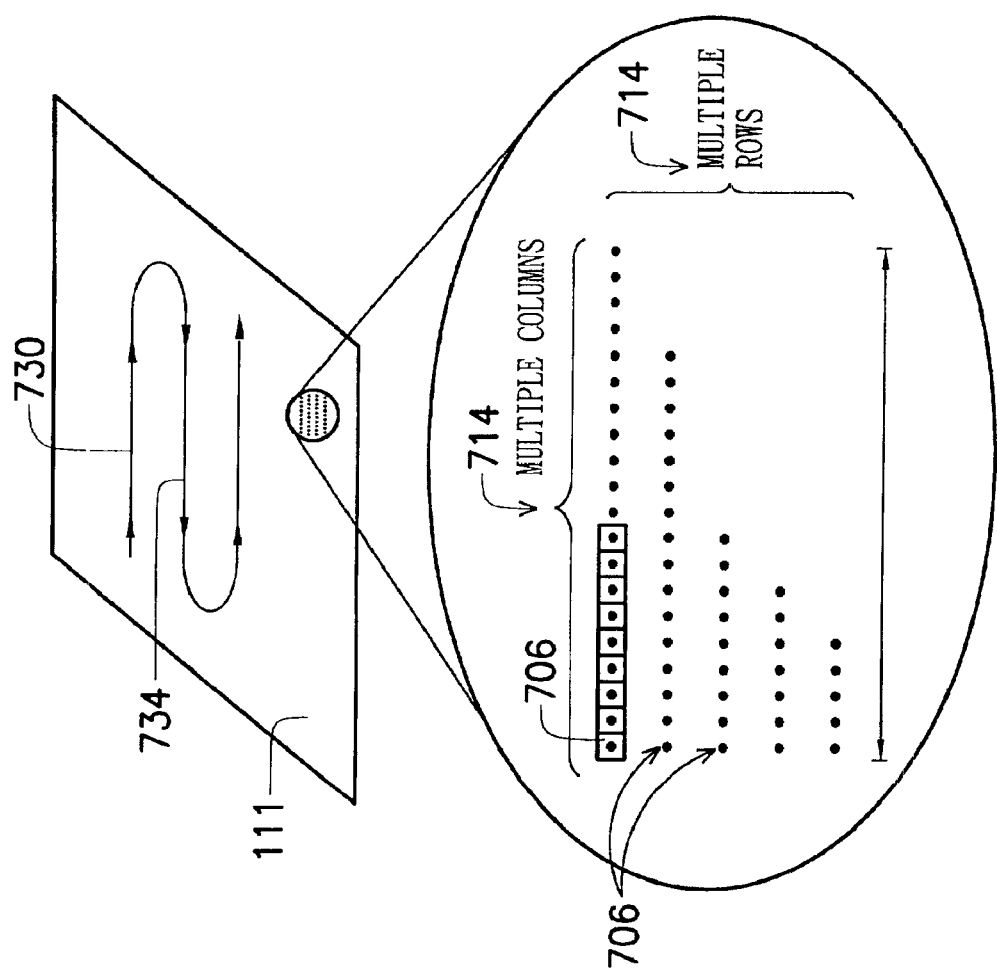
Figures 3A, 3B:
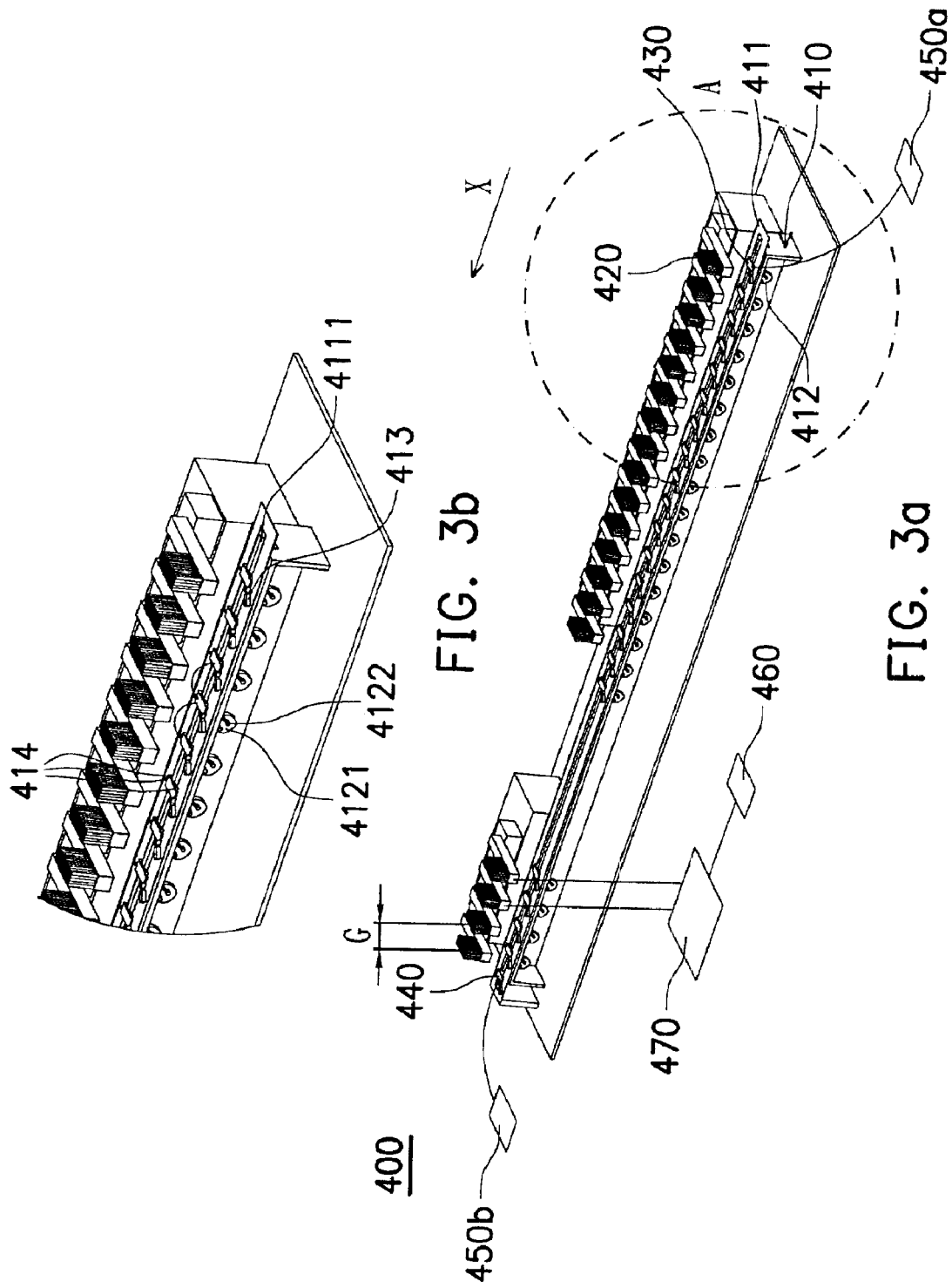
Figure 3C:
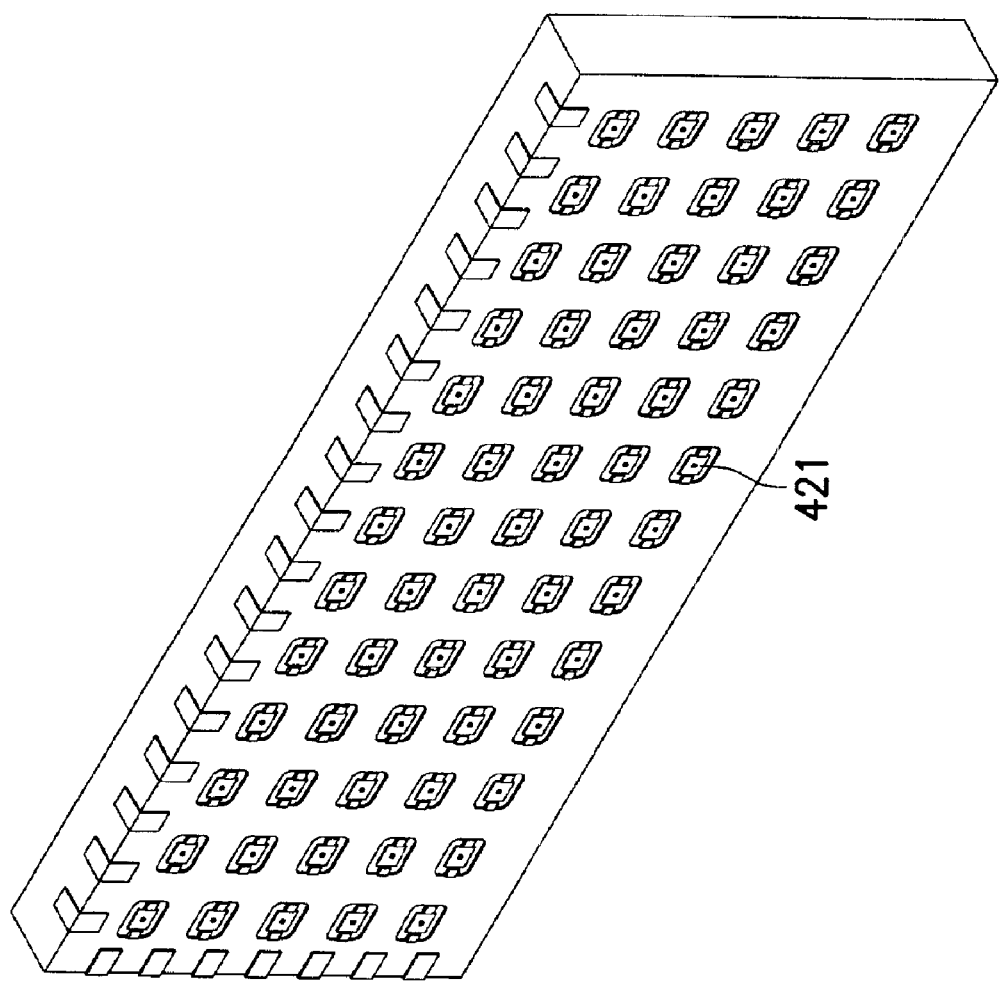
FIG. 3c is a bottom view of a dispenser as disclosed in this invention.

FIG. 3a, FIG. 3b and FIG. 3c show an apparatus 400 for manufacturing a biochip 440 from a substrate 430 according to a first preferred embodiment of the present invention. Apparatus 400 comprises a conveying device 410 and a series of dispensers 420.

The conveying device 410 comprises a base 411, a plurality of transferring devices 412, a plurality of positioning devices 413 and a plurality of retainers 414. The base 411, provided with a slot 4111, is used for receiving and supporting substrate 430. Each of the transferring devices 412 corresponds to a dispenser 420 and comprises a cam 4121 and a rod 4122. Each of the cams 4121 is rotatablly disposed at the base 411. Each of the rods 4122 is connected to a cam 4121 at one end and abuts the substrate 430 through the slot 4111 at the other end. The rod 4122 moves a substrate 430 by the rotation of the cam 4121 from a position below the corresponding dispenser 420 to a position below an adjacent dispenser along the axis X. The positioning devices 413, corresponding to a dispenser 420, are disposed at the base 411 and used for pushing the substrate 430 into a predetermined positionon base 411. Three retainers 414, disposed on the base 411, cooperate with a corresponding positioning device 413 by abutting the substrate 430 to locate the substrate 430 at the predetermined position on the base 411.

Figure 4A:
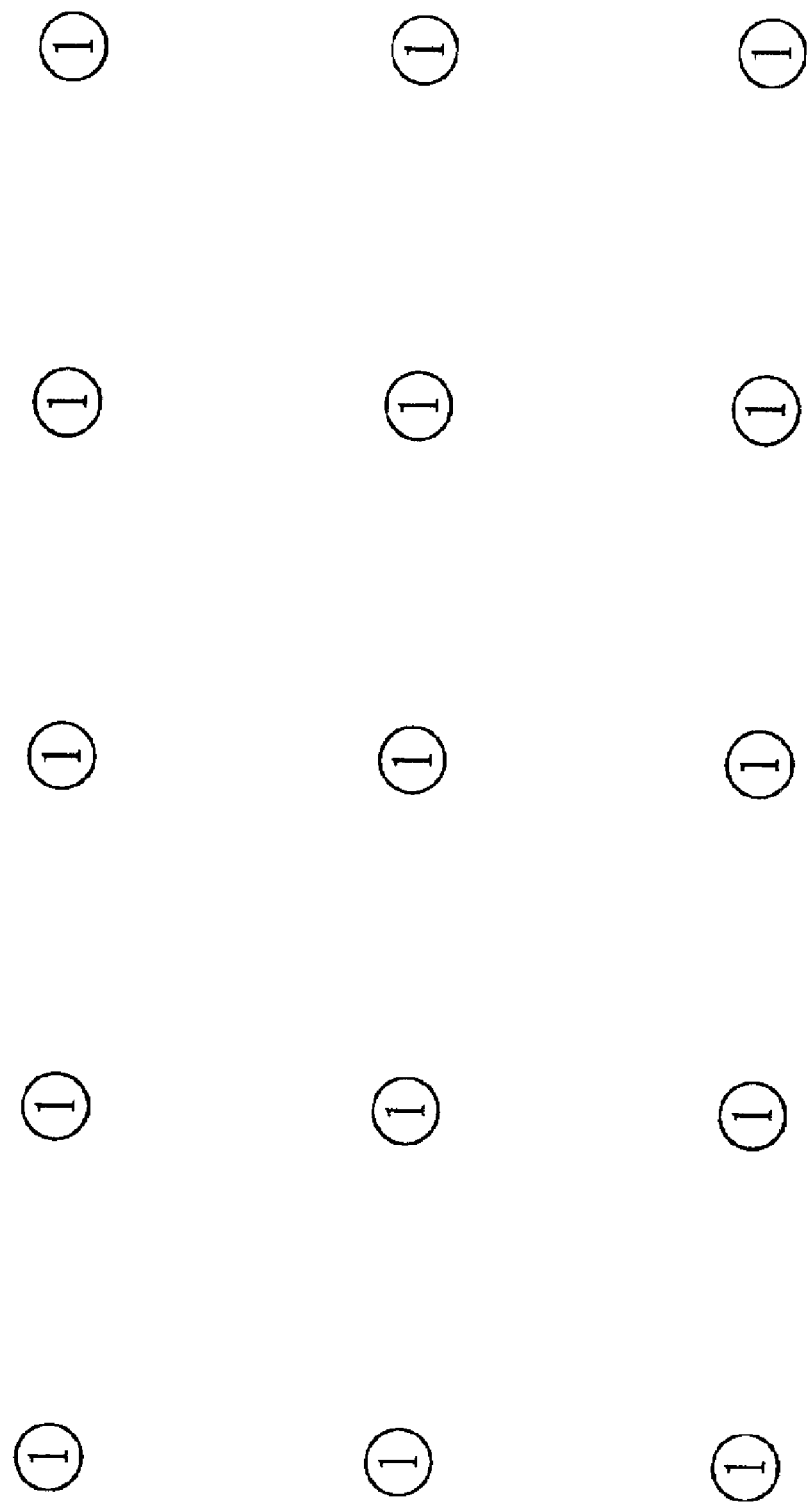
FIGS. 4A-4D are successive views of a substrate on which an array of reagents is disposed according to the method of the present invention.
Figure 4B:
Figure 4C:
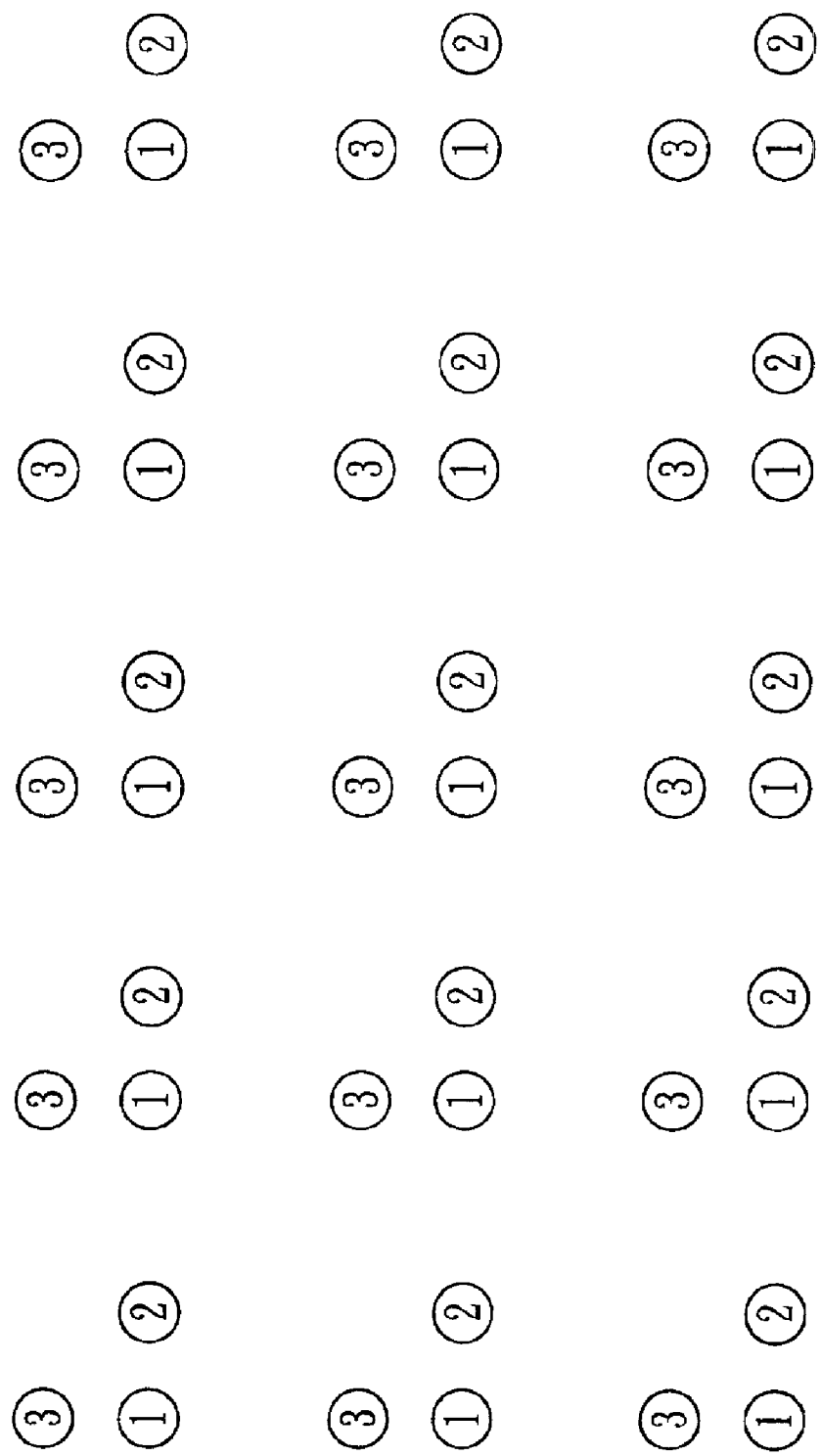
Figure 4D:
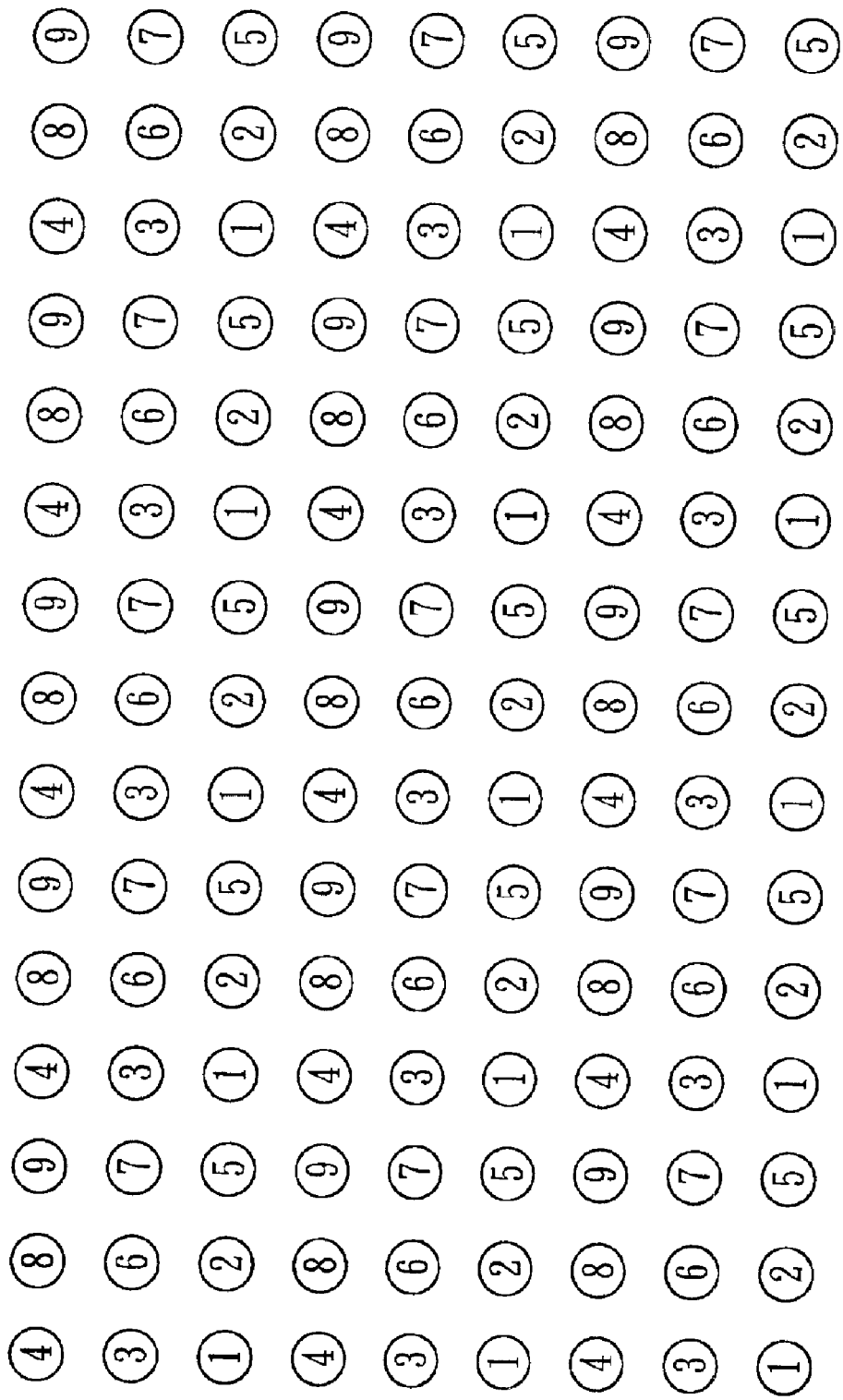

The dispensers 420 are disposed above the conveying device 410 and separated at a predetermined distance G along the axis X. The conveying device 410 moves the substrate 430 the distance G in a step-by-step manner such that the substrate 430 is successively positioned below each dispenser 420. The dispensers 420 comprise a plurality of nozzles 421, as shown in FIG. 3c, facing the substrate 430 disposed on the base 411. Each of the nozzles 421 can dispense a predetermined reagent on a predetermined position of the substrate 430; therefore, one dispenser 420 dispenses a plurality of reagents at different positions on the substrate 430. It is noted that the plurality of reagents dispensed on the substrate 430 by different dispensers 420 in the series are preferably aligned such that the reagents do not overlap, as illustrated in FIGS. 4A to 4D. In FIG. 4A, an array of reagents dispensed by the first dispenser is labeled 1. In FIGS. 4B to 4C, successive arrays dispensed by the second and third are labeled successively 2 and 3. FIG. 4D illustrates an embodiment of a completed biochip after receiving a plurality of reagents from nine dispensers.

A plurality of substrates 430 can be received in turn and supported on the base 411 of the conveying device 410 at the same time. The conveying device 410 simultaneously moves each of the. substrates 430 supported on the base 411 the distance G in a step-by-step manner such that each substrate is moved successively below each dispenser 420. At each stop below a dispenser 420, a plurality of reagents is dispensed onto the substrate 430.

The apparatus 400 further comprises robots 450a, 450b, a series of detecting devices 460 and a controller 470. The robots 450a, 450b can get the substrates 430 on and off the conveying device 410. The series of detecting devices 460, corresponding to the series of dispensers 420 respectively, detects whether the substrate 430 is disposed under the corresponding dispenser. The detecting devices 460 output the detecting results to the controller 470. The controller 470 controls the dispensing of the dispensers 420 based on the signals from the detecting devices 460.

Since multiple substrates can be processed at the same time, the biochips can be mass-produced. As a result, the efficiency of manufacturing the biochips is significantly increased.

It is noted that the description of the manufacturing method, as disclosed in this invention, is based on the manufacturing apparatus with the dispensers. Thus, in this specification, the reagents are formed onto the substrate by dispensing. However, the manufacturing method according to this invention is not restrained within such manner. For example, the reagents can be formed onto the substrate by contact, such as pin-spot.

Second Embodiment

Figure 5:
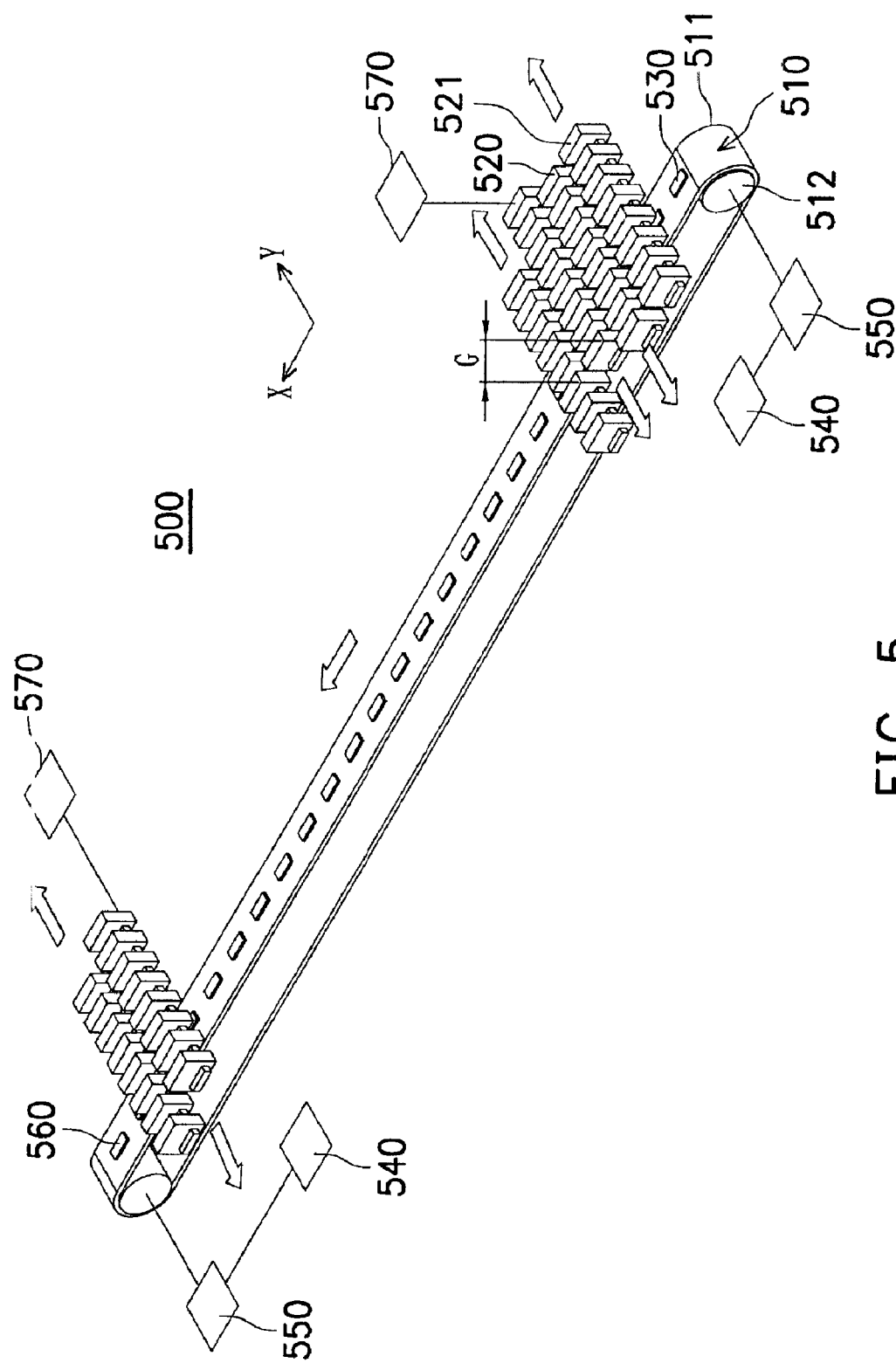
FIG. 5 is a schematic view depicting a second embodiment of a biochip-manufacturing apparatus as disclosed in this invention.

FIG. 5 shows a second preferred embodiment of the present invention. Apparatus 500 for manufacturing biochips 560 from substrates 530 comprises a conveying device 510 and a plurality of dispensers 520, a step motor 550, a plurality of sensors 540 and a driving device 570.

The conveying device 510 comprises a conveying belt 511 and two rollers 512. The conveying belt 511 is used for receiving and supporting at least one substrate 530 thereupon. The rollers 512, electrically connected to the step motor 550, move the conveying belt 511 along a first axis X.

In this embodiment, the dispensers 520 are divided into plurality of groups 521 separated by a predetermined distance G along the first axis X. Each of the groups comprises a plurality of dispensers 520 electrically connected to the driving device 570 and movably disposed along a second axis Y perpendicular to the first axis X.

The step motor 550, electrically connected to the rollers 512 of the conveying device 510, moves the conveying belt 511 of the conveying device 510 the predetermined distance G. Sensors 540, electrically connected to the step motor 550, can be provided to detect the position of the substrate 530 and stop the substrate in a position corresponding to a group of dispensers 521. In either case, the substrates 530 progress along the first axis X in a step-by-step manner such that each substrate is positioned in turn below each group of dispensers 521.

When the substrate 530 is positioned below a group of dispensers 521, the driving device 570 moves the group of dispensers 521 along the second axis Y in a step-by-step manner such that each dispenser is positioned in turn above the substrate 530. When a dispenser 520 is positioned above the substrate 530, a plurality of reagents is dispensed thereupon.

A plurality of substrates 530 can be received in turn and supported on the conveying device 510 at the same time. The conveying device 510 simultaneously moves each of the substrates 530 the distance G in a step-by-step manner such that each substrate is moved successively below each group of dispensers 521. At each stop below a group of dispensers 521, each dispenser 520 in the group of dispensers 521 dispenses a plurality of reagents onto the substrate 530.

Since multiple substrates can be processed at the same time, the biochips can be mass-produced. As a result, the efficiency of manufacturing the biochips is significantly increased.

It is understood that a robot can be used to get the substrate 530 on and off the conveying device 510. Also, the sensors 540 can output the detecting results to a controller (not shown). Such controller can control the dispensing of the dispensers 520 based on the signals from the sensors 540.

Third Embodiment

Figure 6:
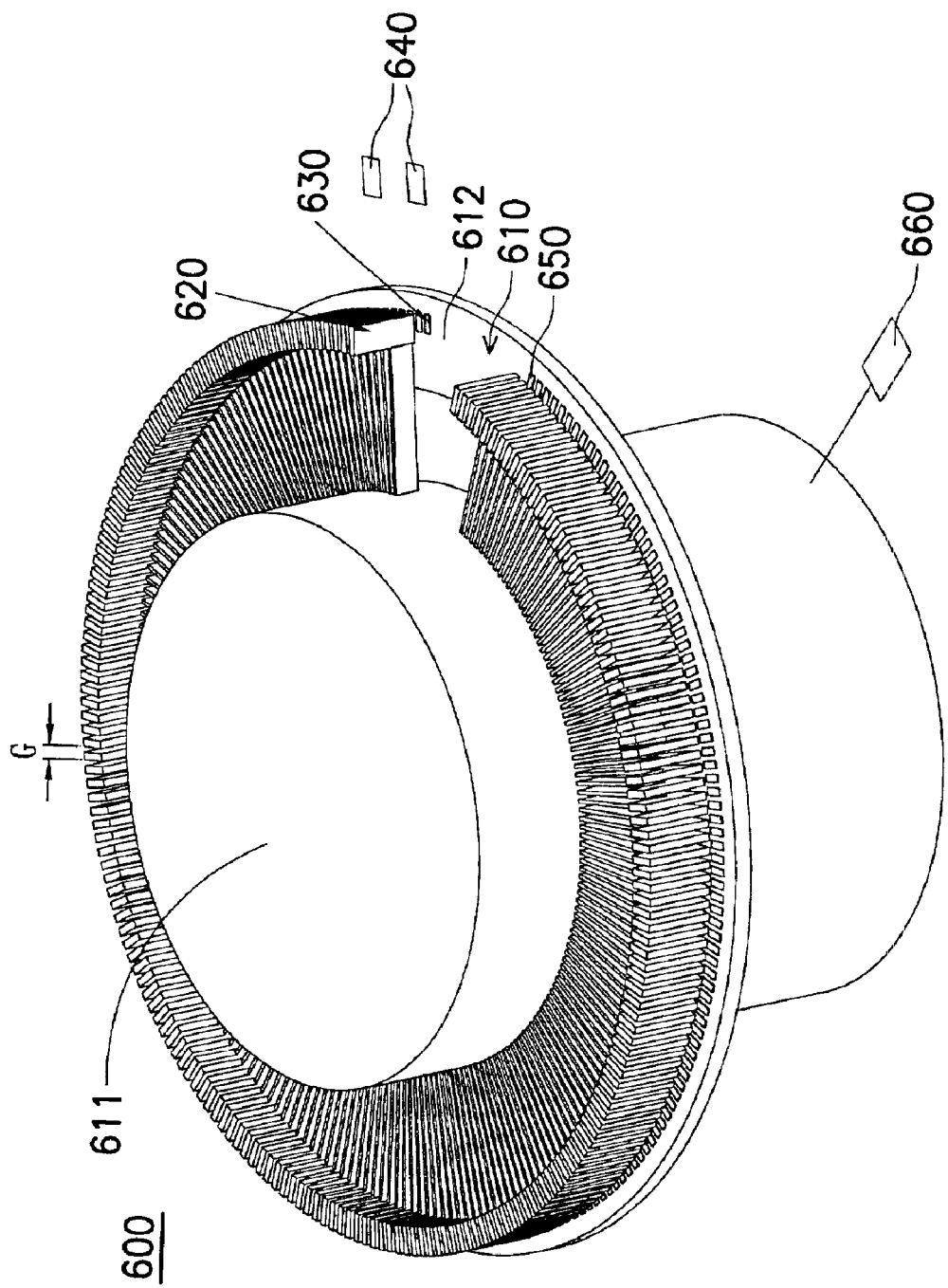
FIG. 6 is a schematic view depicting a third embodiment of a biochip-manufacturing apparatus of this invention.

FIG. 6 shows a third embodiment of an apparatus 600 for manufacturing a biochip 650 from a substrate 630 according to the present invention. Apparatus 600 comprises a conveying device 610 and a plurality of dispensers 620, a step motor 660 and a plurality of sensors 640.

The conveying device 610 comprises a rotor 611 and a platform 612. The rotor 611 is electrically connected to the step motor 660 so that it can rotate the platform 612 by the actuation of the step motor 660. The platform 612, disposed around the rotor 611, is used for receiving and supporting substrates 630. The platform 612 is circular shape, and the dispensers 620 are disposed in a ring and separated by a predetermined distance G. The conveying device 610 rotates each substrate 630 such that it travels an arc covering the predetermined distance G in a step-by-step manner so that the substrate is positioned in turn below each dispenser 620 during the fabrication of the biochip. When the substrate 630 is positioned below each dispenser 620, a plurality of reagents is dispensed thereupon.

A plurality of substrates 630 can be received in turn and supported on the conveying device 610 at the same time. The conveying device 610 simultaneously moves each of the substrates 630 the distance G in a step-by-step manner such that each substrate is moved successively below each dispenser 620. At each stop below a dispenser 620, a plurality of reagents is dispensed onto the substrate 630. Since multiple substrates can be processed at the same time, the biochips can be mass-produced. As a result, the efficiency of manufacturing the biochips is significantly increased.

It is understood that a robot can be used to get the substrate 630 on and off the conveying device 610. Also, the sensors 640 can output the detecting results to a controller (not shown). Such controller can control the dispensing of the dispensers 620 based on the signals from the sensors 640.

Fourth Embodiment

FIG. 7a and FIG. 7b show an apparatus 400 for manufacturing a biochip 740 from a substrate 730 according to a fourth preferred embodiment of the present invention. Apparatus 700 comprises a conveying device 710 and a series of dispensers 720.

The conveying device 710 comprises a base 711, a plurality of transferring devices 712, a plurality of positioning devices 713, a plurality of retainers 714 and a plurality of fixtures 715. The base 711, provided with a slot 7111, is used for the fixtures 715 disposing thereupon. Each of the transferring devices 712 corresponds to a dispenser 720 and comprises a cam 7121 and a rod 7122. Each of the cams 7121 is rotatably disposed at the base 711. Each of the rods 7122 is connected to a cam 7121 at one end and abuts the fixture 715 through the slot 7111 at the other end. The rod 7122 moves a fixture 715 by the rotation of the cam 7121 from a position below the corresponding dispenser 720 to a position below an adjacent dispenser along the axis X. The positioning devices 713, corresponding to a dispenser 720, are disposed at the base 711 and used for pushing the fixture 715 into a predetermined position on base 711. Three retainers 714, disposed on the base 711, cooperate with a corresponding positioning device 713 by abutting the fixture 715 to locate the fixture 715 at the predetermined position on the base 711. Each of the fixtures 715, disposed on the base 711, is used for receiving and supporting the substrate 730.

The dispensers 720 are disposed above the conveying device 710 and separated at a predetermined distance G along the axis X. The conveying device 710 moves the fixture 715 the distance G in a step-by-step manner such that the substrate 730, disposed on the fixture 715, is successively positioned below each dispenser 720. The dispensers 720 comprise a plurality of nozzles (not shown), same with the first embodiment, facing the substrate 730 disposed on the fixture 715. Each of the nozzles can dispense a predetermined reagent on a predetermined position of the substrate 730; therefore, one dispenser 720 dispenses a plurality of reagents at different positions on the substrate 730. It is noted that the reagents dispensed on the substrate 730 by different dispensers 720 in the series are preferably aligned such that the reagents do not overlap.

A plurality of substrates 730 can be received in turn and supported on the different bases 711 of the conveying device 710 at the same time. The conveying device 710 simultaneously moves each of the substrates 730 supported on the fixtures 715 the distance G in a step-by-step manner such that each substrate is moved successively below each dispenser 720. At each stop below a dispenser 720, a plurality of reagents is dispensed onto the substrate 730.

The apparatus 700 further comprises robots 750a, 750b, a series of detecting devices 760 and a controller 770. The robots 750a, 750b can get the substrates 730 on and off the conveying device 710. The series of detecting devices 760, corresponding to the series of dispensers 720 respectively, detects whether the substrate 730 is disposed under the corresponding dispenser. The detecting devices 760 output the detecting results to the controller 770. The controller 770 controls the dispensing of the dispensers 720 based on the signals from the detecting devices 760.

Since multiple substrates can be processed at the same time, the biochips can be mass-produced. As a result, the efficiency of manufacturing the biochips is significantly increased.

In addition, since the substrate is supported by the fixture in this embodiment, it is prevented from damaging during conveying.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. An apparatus for manufacturing at least one biochip from at least one substrate comprising: a conveying device for moving the substrate through a series of receiving positions; a series of dispensers positioned at a series of dispensing positions relative to the series of receiving positions of the conveying device, wherein each of the dispensers has a plurality of nozzles, and each of the nozzles dispenses a predetermined reagent onto the substrate; a plurality of positioning devices disposed on the conveying device, corresponding to each position of the series of dispensing positions: and a plurality of retainers, disposed on the conveying device, corresponding to each of the plurality of positioning devices: wherein each dispenser in the series of dispensers dispenses a plurality of reagents onto the substrate when the substrate is positioned in the corresponding receiving position.

2. The apparatus as claimed in claim 1, wherein the dispensers are separated by a predetermined distance along a first axis defined by the motion of the substrate, and the conveying device moves the substrate the predetermined distance in a step-by-step manner.

3. The apparatus as claimed in claim 2, wherein the series of dispensers are aligned such that the reagents, dispensing from different dispensers, do not overlap.

4. The apparatus as claimed in claim 3, wherein the conveying device comprises:
a base for receiving and supporting the substrate; and
a plurality of transferring devices, disposed at the base, for moving the substrate from one of the series of dispensing positions to the next in the series of dispensing positions.

5. The apparatus as claimed in claim 4, wherein the base is provided with a slot, and each of the transferring devices comprises:
a cam rotatablly disposed at the base; and
a rod extending through the slot for moving the substrate, wherein the rod is connected to the cam at one end, and abuts the substrate at the other end, wherein the rod moves the substrate by the rotation of the cam.

6. The apparatus as claimed in claim 3, wherein the conveying device comprises:
a plurality of fixtures for receiving and supporting the substrate;
a base for disposing the fixtures thereupon; and
a plurality of transferring devices, disposed at the base, for moving the fixture from one of the series of dispensing positions to the next in the series of dispensing positions.

7. The apparatus as claimed in claim 6, wherein the base is provided with a slot, and each of the transferring devices comprises:
a cam rotatablly disposed at the base; and
a rod extending through the slot for moving the fixture, wherein the rod is connected to the cam at one end, and abuts the fixture at the other end, wherein the rod moves the fixture by the rotation of the cam.

8. The apparatus as claimed in claim 3, further comprising:
a step motor, electrically connected to the conveying device, for moving the conveying device the predetermined distance; and
at least one sensor, for detecting the position of the substrate, electrically connected to the step motor, whereby the movement of the substrate, moving along with the conveying device, depends on the detection of the sensor.

9. The apparatus as claimed in claim 8, wherein the conveying device comprises:
a conveying belt for receiving and supporting the substrate thereupon; and
two rollers, electrically connected to the step motor, for moving the conveying belt.

10. The apparatus as claimed in claim 9, wherein the dispensers are divided into plural groups at the predetermined distance in the first axis, and each group of the dispensers moves in a second axis perpendicular to the first axis.

11. A method for manufacturing at least one biochip from at least one substrate comprising the steps of: providing a conveying device having a plurality of positioning devices and a plurality of retainers at each of a series of receiving positions; receiving the substrate on a the conveying device; conveying and positioning the substrate through the series of receiving positions corresponding to a series of dispensing positions by each corresponding positioning device; retaining said substrate at each dispensing position; and dispensing a series of reagents onto the substrate at each dispensing position.

12. The method as claimed in claim 11, wherein the series of receiving positions are linearly arranged.

13. The method as claimed in claim 11, wherein the series of receiving positions are arranged in a ring.

14. The method as claimed in claim 11, wherein the series of reagents is non-overlapping.

15. The method as claimed in claim 11, wherein a plurality of substrates are received onto the conveying device simultaneously, each of the plurality of substrates being conveyed through the series of receiving positions is a step-by-step manner.

16. An apparatus for manufacturing at least one biochip from at least one substrate comprising:
a conveying device for moving the substrate through a series of receiving positions;
a series of dispensers positioned at a series of dispensing positions relative to the series of receiving positions of the conveying device, wherein each of the dispensers has a plurality of nozzles, each of the nozzles dispenses a predetermined reagent onto the substrate, and each dispenser in the series of dispensers dispenses a plurality of reagents onto the substrate when the substrate is positioned in the corresponding receiving position;
a plurality of positioning devices, disposed on the conveying device, corresponding to the series of dispensing positions; and
a plurality of retainers, disposed on the conveying device, corresponding to the plurality of positioning devices, wherein each of the positioning devices pushes the substrate into a predetermined position corresponding to dispensing position and the retainers hold the substrate in the predetermined position.

17. The apparatus as claimed in claim 16, wherein the dispensers are separated by a predetermined distance along a first axis defined by the motion of the substrate, and the conveying device moves the substrate the predetermined distance in a step-by-step manner.

18. The apparatus as claimed in claim 17, wherein the series of dispensers are aligned such that the reagents, dispensing from different dispensers, do not overlap.

19. The apparatus as claimed in claim 18, wherein the conveying device comprises:
- a base for receiving and supporting the substrate; and
- a plurality of transferring devices, disposed at the base, for moving the substrate from one of the series of dispensing positions to the next in the series of dispensing positions.

20. The apparatus as claimed in claim 19, wherein the base is provided with a slot, and each of the transferring devices comprises:
- a cam rotatablly disposed at the base; and
- a rod extending through the slot for moving the substrate, wherein the rod is connected to the cam at one end, and abuts the substrate at the other end, wherein the rod moves the substrate by the rotation of the cam.

21. The apparatus as claimed in claim 18, further comprising:
- a step motor, electrically connected to the conveying device, for moving the conveying device the predetermined distance; and
- at least one sensor, for detecting the position of the substrate, electrically connected to the step motor, whereby the movement of the substrate, moving along with the conveying device, depends on the detection of the sensor.

22. The apparatus as claimed in claim 21, wherein the conveying device comprises:
- a conveying belt for receiving and supporting the substrate thereupon; and
- two rollers, electrically connected to the step motor, for moving the conveying belt.

23. The apparatus as claimed in claim 22, wherein the dispensers are divided into plural groups at the predetermined distance in the first axis, and each group of the dispensers moves in a second axis perpendicular to the first axis.

24. An apparatus for manufacturing at least one biochip from at least one substrate comprising:
- a conveying device, having a plurality of fixtures for receiving and supporting the substrate, for moving the substrate through a series of receiving positions;
- a series of dispensers positioned at a series of dispensing positions relative to the series of receiving positions of the conveying device, wherein each of the dispensers has a plurality of nozzles, each of the nozzles dispenses a predetermined reagent onto the substrate, and each dispenser in the series of dispensers dispenses a plurality of reagents onto the substrate when the fixture is positioned in the corresponding receiving position;
- a plurality of positioning devices, disposed on the base, corresponding to the series of dispensing positions; and
- a plurality of retainers, disposed on the base, corresponding to the plurality of positioning devices, wherein each of the positioning devices pushes the fixture into a predetermined position corresponding to dispensing position and the retainers hold the fixture in the predetermined position.

25. The apparatus as claimed in claim 24, wherein the dispensers are separated by a predetermined distance along a first axis defined by the motion of the substrate, and the conveying device moves the substrate the predetermined distance in a step-by-step manner.

26. The apparatus as claimed in claim 25, wherein the series of dispensers are aligned such that the reagents, dispensing from different dispensers, do not overlap.

27. The apparatus as claimed in claim 26, wherein the conveying device comprises:
- a base for disposing the fixtures thereupon; and
- a plurality of transferring devices, disposed at the base, for moving the fixture from one of the series of dispensing positions to the next in the series of dispensing positions.

28. The apparatus as claimed in claim 27, wherein the base is provided with a slot, and each of the transferring devices comprises:
- a cam rotatablly disposed at the base; and
- a rod extending through the slot for moving the fixture, wherein the rod is connected to the cam at one end, and abuts the fixture at the other end, wherein the rod moves the fixture by the rotation of the cam.

29. The apparatus as claimed in claim 26, further comprising:
- a step motor, electrically connected to the conveying device, for moving the conveying device the predetermined distance; and
- at least one sensor, for detecting the position of the substrate, electrically connected to the step motor, whereby the movement of the substrate, moving along with the conveying device, depends on the detection of the sensor.

30. The apparatus as claimed in claim 29, wherein the conveying device comprises:
- a conveying belt for receiving and supporting the substrate thereupon; and
- two rollers, electrically connected to the step motor, for moving the conveying belt.

31. The apparatus as claimed in claim 30, wherein the dispensers are divided into plural groups at the predetermined distance in the first axis, and each group of the dispensers moves in a second axis perpendicular to the first axis.

* * * * *